(12) United States Patent  (10) Patent No.: US 8,117,911 B2
Rose  (45) Date of Patent: Feb. 21, 2012

(54) GAUGE FOR BULK FUEL STORAGE TANKS

(76) Inventor: Dennis Rose, Midland, TX (US)

( * ) Notice: Subject to any disclaimer, the term of this patent is extended or adjusted under 35 U.S.C. 154(b) by 387 days.

(21) Appl. No.: 12/464,222

(22) Filed: May 12, 2009

(65) Prior Publication Data

US 2010/0288042 A1    Nov. 18, 2010

(51) Int. Cl.
*G01F 23/30* (2006.01)
(52) U.S. Cl. ............... 73/309; 73/311; 73/305; 73/321; 73/319; 73/290 R
(58) Field of Classification Search .................. 73/309, 73/311, 305, 321, 319, 290 R, 290 B, 325; 242/615
See application file for complete search history.

(56) References Cited

U.S. PATENT DOCUMENTS

| 37,709 | A | | 2/1863 | Smedley | |
|---|---|---|---|---|---|
| 532,868 | A | | 1/1895 | Bull | |
| 872,753 | A | | 12/1907 | Runyon | |
| 1,741,792 | A | * | 12/1929 | Rinehart | 73/321 |
| 2,568,361 | A | * | 9/1951 | Pettigrove | 73/311 |
| 2,874,574 | A | * | 2/1959 | Patureau | 73/321 |
| 2,949,777 | A | | 8/1960 | Ferron | |
| 4,255,859 | A | * | 3/1981 | Klieman | 33/715 |
| 4,459,584 | A | | 7/1984 | Clarkson | |
| 4,709,653 | A | | 12/1987 | Salomon | |
| 4,890,493 | A | | 1/1990 | Johnson | |
| 5,050,432 | A | | 9/1991 | Barritt | |
| D334,718 | S | * | 4/1993 | Basden et al. | D10/101 |
| 5,425,329 | A | | 6/1995 | Pollock | |
| 6,536,277 | B1 | * | 3/2003 | Chuang | 73/319 |
| 7,066,024 | B2 | * | 6/2006 | Watchel | 73/444 |
| 7,129,832 | B2 | | 10/2006 | Sabatino | |
| 7,216,537 | B2 | * | 5/2007 | Margolin et al. | 73/314 |
| 7,353,704 | B2 | * | 4/2008 | Clanton | 73/321 |
| 2005/0235749 | A1 | * | 10/2005 | Morris | 73/313 |
| 2007/0234799 | A1 | * | 10/2007 | McGillis et al. | 73/306 |
| 2010/0122988 | A1 | * | 5/2010 | Clanton | 220/565 |

FOREIGN PATENT DOCUMENTS

JP    61281923 A  * 12/1986

* cited by examiner

*Primary Examiner* — Hezron E Williams
*Assistant Examiner* — Rodney T Frank
(74) *Attorney, Agent, or Firm* — Todd L. Juneau; Joseph Hanrahan (57) ABSTRACT

This invention relates to bulk liquid storage tanks, and in particular to an improved tank gauge for measuring the amount of liquid within the tank and for monitoring the movement or settling of the storage tank.

3 Claims, 8 Drawing Sheets

GAUGE FOR BULK FUEL STORAGE TANKS

CROSS REFERENCE TO RELATED APPLICATIONS

Not applicable.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

REFERENCE TO A SEQUENCE LISTING

Not applicable.

BACKGROUND

1. Field of the Invention

This invention relates to bulk liquid storage tanks, and in particular to an improved tank gauge for measuring the amount of liquid within the tank and for monitoring the movement or settling of the storage tank.

2. Background of the Invention

Bulk fuel storage tanks can range from about 2,500 gallons up to about 1,000,000 gallons in capacity. Above-ground storage tanks (ASTs) are regulated by various federal and state authorities who distinguish between storage tanks and dispensing tanks.

In bulk storage tanks, especially bulk fuel storage tanks, it is necessary to be able to quickly and safely measure the amount of fuel within the tank. Some products have consisted of an internal float or other measuring mechanism which is connected to either a mechanical or electrical readout for providing information on the amount of liquid within the tank.

For instance, U.S. Pat. No. 37,709 to Smedley discloses an oil still for drawing water off and separating it from oil.

U.S. Pat. No. 532,868 to Bull discloses an electrical annunciator having a float for water tanks that sets off an alarm when a certain capacity is reached or the tank becomes empty, and discloses a trolley connected on a cable strung between the float and the counterpoise.

U.S. Pat. No. 872,753 to Runyun discloses an indicating and registering device for railroad water tanks and reservoirs having a float attached to a rope and pulley, and a counter-weight, the counter-weight having a series of wheels with teeth and trip pins for registering the distance travelled.

U.S. Pat. No. 5,425,329 to Pollock discloses a feed bin fill indicator having a flag that moves vertically along an external track having a reference position.

U.S. Pat. No. 5,050,432 to Barritt discloses a tank gauge for oil tanks having a double pulley on a common shaft which is journaled in the wall of a sealed housing, one of the pulleys attached to a 13 pound float on the interior of the tank, the other pulley attached to a 9 pound weight on the exterior of the tank.

U.S. Pat. No. 7,129,832 to Sabatino discloses a high/low level alarm controller having the ability to interface with level sensing equipment.

U.S. Pat. No. 4,459,584 to Clarkson discloses an automatic liquid level indicator and alarm system for petroleum storage tanks, having an intra-tank float with magnets that moves vertically between magnetic sensors connected to an RF transmitter.

U.S. Pat. No. 4,709,653 to Salomon discloses a mechanical fluid indicator on a continuous loop belt having a float and marking elements affixed thereon.

U.S. Pat. No. 4,890,493 to Johnson et al. discloses an automatic tank reading gauge in the shape of a vertical loop having a clear sight area at the top for viewing marking related to the amount of fluid, and which protrudes from the tank being measured.

U.S. design Pat. D334,718 to Basden et al. discloses a liquid storage tank gauge in the form of a cylinder having indicia marked thereon.

U.S. Pat. No. 2,949,777 to Ferron discloses a liquid level gauge for measuring liquid levels of tall tanks, and includes a mirror for observing the volume reading, the mirror being mounted on a gauge system having pulleys and counter-weights and an intra-tank float.

However, in systems where the gauge includes a cylindrical tube having a marker disposed within the tube, the cylindrical tube is made from plastic, and although this product appears to solve the problem of determining remaining capacity, unexpected problems have arisen.

One problem stems from the fact that the cylindrical tube was made from plastic in order to save expense and make manufacturing easier. However, it has been determined that the capacity markings, or indicia, on the side of the plastic cylinder often wear off after being subjected to environmental conditions over time.

Other commercial embodiments, are attached to the steel aboveground fuel storage tank using a fiberglass mount, which also gets subjected to environmental wear and tear over time

BRIEF SUMMARY OF THE INVENTION

An important component of this work includes the combination of benefits derived from a high-visibility tank gauge system, a high-quality anti-fouling feature for the cable, and a feature for monitoring the structural integrity of the bulk storage tank.

In a preferred embodiment, a tank gauge is provided for bulk liquid above-ground storage tanks, comprising: an elongated outer gauge tube, wherein the outer gauge tube is steel and is C-shaped in cross-section forming an open channel, said outer gauge tube being attached in a vertical position proximate to the bulk liquid above-ground storage tank by a plurality of bolt and nut fasteners, said outer gauge tube having a plurality of indicia marked thereon and associated with the liquid level of said storage tank, said outer gauge tube being attached to the base of the storage tank by a frangible footer attachment, said footer attachment capable of being frangibly detached from the base of the storage tank when subjected to a force associated with the settling or moving of the storage tank, and wherein the outer gauge tube houses a weighted slidable inner gauge, said weighted slidable inner gauge capable of travelling vertically within the outer gauge tube by action of a cable, said slidable inner gauge having a plurality of indicia marked thereon and associated in combination with the indicia on the outer gauge tube with the liquid level of said storage tank, said cable connected to the slidable inner gauge and disposed within the outer gauge tube, said cable in operative association with a pulley system for connecting the slidable inner gauge to a weighted intra-tank float, said pulley system comprising at least one first pulley attached to the top edge of the storage tank and in operative alignment with the outer gauge tube, and at last one second pulley attached to the top of the storage tank for directing said cable into a through-hole in the top of the storage tank for connection to the weighted intra-tank float.

In another preferred embodiment, there is provided a tank gauge further comprising wherein the outer gauge tube is powder-coated steel.

In another preferred embodiment, there is provided a tank gauge further comprising wherein the frangible footer comprises a deformable steel plate and frangible steel bolt and nut-type fasteners.

In another preferred embodiment, there is provided wherein the deformable steel plate further comprises indicia on the plate for measuring tank settlement movement.

In another preferred embodiment, there is provided a tank gauge further comprising wherein the cable is steel cable having a plastic coating, the diameter of the plastic coated steel cable ranging from about 1/8 inch to about 1/4 inch.

In another preferred embodiment, there is provided wherein the tank gauge further comprises an electronic sensor system for reporting one or more critical liquid levels within the storage tank, or for reporting change to the frangible footer.

In another preferred embodiment, there is provided wherein weighted intra-tank float comprises at least one water-phase float, and at least one oil-phase float.

In another preferred embodiment, there is provided a retrofitting kit for measuring combined liquid level data and tank settling data within a bulk above-ground storage tank, comprising the tank gauge described and claimed herein and installation instructions.

In another preferred embodiment, there is provided a method for measuring combined liquid level data and tank settling data within a bulk above-ground storage tank, comprising: reading indicia from the combined outer gauge tube and slidable inner gauge of the tank gauge described herein, reading indicia from the deformable steel plate of the frangible footer, and recording both readings.

BRIEF DESCRIPTION OF THE DRAWINGS

FIG. 1 shows the outer gauge tube having spaced-apart numbers for measuring larger units, e.g. feet, with the slidable inner gauge having the number indicia for measuring subparts, e.g. inches. The platform is not part of the invention but represents typical structures that are affixed to the outside of fuel storage storage tanks, and is shown to indicate one example of the relative size of the gauges.

FIG. 5 shows one end of the outer gauge attached to an L bracket, which connects to a mounting bracket, e.g. for mounting a pulley or for mounting to the ground, etc.

DETAILED DESCRIPTION OF THE INVENTION

Definitions

The following definitions are provided as an aid to understanding the detailed description of the present invention.

The phrase "bulk fuel storage tank" refers to above-ground storage tanks (ASTs) ranging in capacity from about 2,500 gallons to about 1,000,000 gallons. Below the 2,500 gallon mark, many tanks are not storage tanks, but rather, are dispensing tanks.

The improved gauge for bulk fuels storage tanks addresses a number of problems found in the prior art. In one preferred embodiment, the invention comprises, in general, an outer gauge tube having a slidable inner gauge unit that is connected by a cable and pulley to an intra-tank float, such that as the liquid within the tank rises or falls, the float, and thus the inner gauge, move in a corresponding manner.

Sturdiness

Specifically, the outer gauge tube is manufactured from powder-coated steel and has (typically) numerical indicia on the outer surface for measuring the location of the slidable inner gauge. This construction allows the outer gauge tube to last up to 5 times longer than other commercially available plastic housing tubes. The outer gauge tube is attached to the bulk fuel storage tank using bolts, which is possible since both the gauge tube and tank wall are generally made from steel.

Visibility

The outer gauge tube comprises a channel, i.e. is C-shaped in cross-section, and houses the slidable inner gauge in such manner that it also allows for the slidable inner gauge to be easily visible from a distance. The slidable inner gauge slides vertically along the length of the outer gauge tube as it travels according to the lead provided by the supporting steel cable. By having liquid level markings on both the outer gauge tub and the slidable inner gauge, it provides for larger, more easily readable markings. Further, by having the outer gauge tube as an channel open to the environment, the visibility of the slidable inner gauge is not obstructed by being encased within a closed tube as in in the prior art. This is important because, if the tube is transparent plastic, environmental conditions will generally cause such plastic tubes to wear and become opaque and clouded, and result in lowered visibility of the inner gauge.

Weighted/Anti-Fouling

The slidable inner gauge, unlike other commercial gauges made from plastic, is sufficiently heavy, on balance with the intra-tank float, to reduce and eliminate the problem that occurs when the float twists or the slidable inner gauge is subjected to external environmental forces, namely that the cable becomes tangled with the pulley and stops functioning. Using a steel cable with sufficiently heavy anchoring end-pieces, maintains tension on the cable and avoids having it fouled. In a preferred embodiment, the steel cable is about 1/8" diameter cable and has a plastic coating, resulting in an overall 1/4" cable.

Improved Marking/Improved Safety

Referring now to the slidable inner gauge, one critical feature in addition to those named herein, is that both the slidable inner gauge and the outer tube gauge are both marked with indicia. Specifically, in a preferred embodiment, the outer tube gauge is marked with, for instance, markings for each foot of distance, and the slidable inner gauge is marked with inches. This is critical because environmental factors such a sun, wind, etc., very quickly remove indicia from lesser-built plastic gauge systems. This not only makes the system unusable, but by making the gauge hard to read or impossible to read, it puts any person charged with reading such a gauge in harms way since bulk fuel storage tanks are known to off-gas very toxic gases such as $H_2S$. By providing a mechanism for reading the gauge at a distance, the danger to personnel is significantly reduced or eliminated.

An additional benefit of having indicia on both the slidable inner gauge and the outer tube gauge is that the markings can be much larger, and thus more easily readable by personnel.

Robust Pulleys

The cable, which suspends the slidable inner gauge within the outer tube gauge, travels within or is housed within, the outer tube gauge. The gauge system is bolted vertically onto the outside of the steel bulk fuel storage tank. At the top of the tank, there is mounted a first pulley at the edge of the tank, and a second pulley over an entry hole, through which the cable descends to connect to the intra-tank float. The pulleys of the present invention, unlike commercially available plastic systems which are affixed with adhesive, are mounted using bolts onto the tank. This provides the support necessary due to the weight/moment of the cable against the pulleys caused by the intra-tank float and the slidable inner gauge.

Weighted Intra-Tank Float

Referring now to the intra-tank float, in a preferred embodiment it is constructed of milled steel square tubing. In a preferred embodiment, the slidable inner gauge weighs from about 1 to about 5 lbs, and the intra-tank float weighs from about 3 to about 15 lbs., or 4 to 10 lbs. However, it is considered within the scope of the invention to utilize any sufficient weight, or weight combination, which eliminates the fouling of the cable. A weight/weight ratio of about 1 to about 4 between the slidable inner gauge and the intra-tank float is preferred. In a preferred embodiment, the float system may comprise two separate floats: a water phase float and an oil phase (interface) float. Interface being the paraffin, scaling, water, and oil emulsion that sits between the oil on top and the water on the bottom. In one preferred configuration, the use of two floats provides are more accurate reading of the amount of oil in the storage tank.

Footer Plate/Safety Feature

Referring now to the footer plate, this is a plate which attaches the vertical outer tube gauge to the base of the bulk fuel storage tank. It is well known that bulk ASTs often settle over time deeper into their foundational footprint. Further, environmental conditions such as rusting of the base of the tank from unwanted water or other structural movement of the tank, can be extremely dangerous. A tank breach can easily pose life-threatening situations at a moment's notice. The present invention uses bendable steel to attach the vertical tube to the tank at the base, or bottom, or the tank. This way, if the tank experiences any structural change or settling, the bendable steel is designed as an intentional point of failure which would cause the joint to merely pop-off. The unattached bottom joint provides an alert to personnel responsible for inspecting the tank and lets them know that the tank is not longer true to the vertical steel outer gauge tube.

Electronic Sensors

Also contemplated as within the scope of this invention is the use of electronic sensors to detect and alert personnel, locally and remotely, to the liquid level within the storage tank. Also contemplated is the use of sensor to also detect any movement or shifting of the bulk storage tank by detecting changes to the frangible footer. These sensors can be magnetic, optic, electronic, etc. as is known in the art. For example, U.S. Pat. No. 4,459,584 describes an automatic sensor based tank gauge, the contents of which are incorporated herein in their entirety for any teaching that may be helpful to a person of skill in this field.

Figure 1:
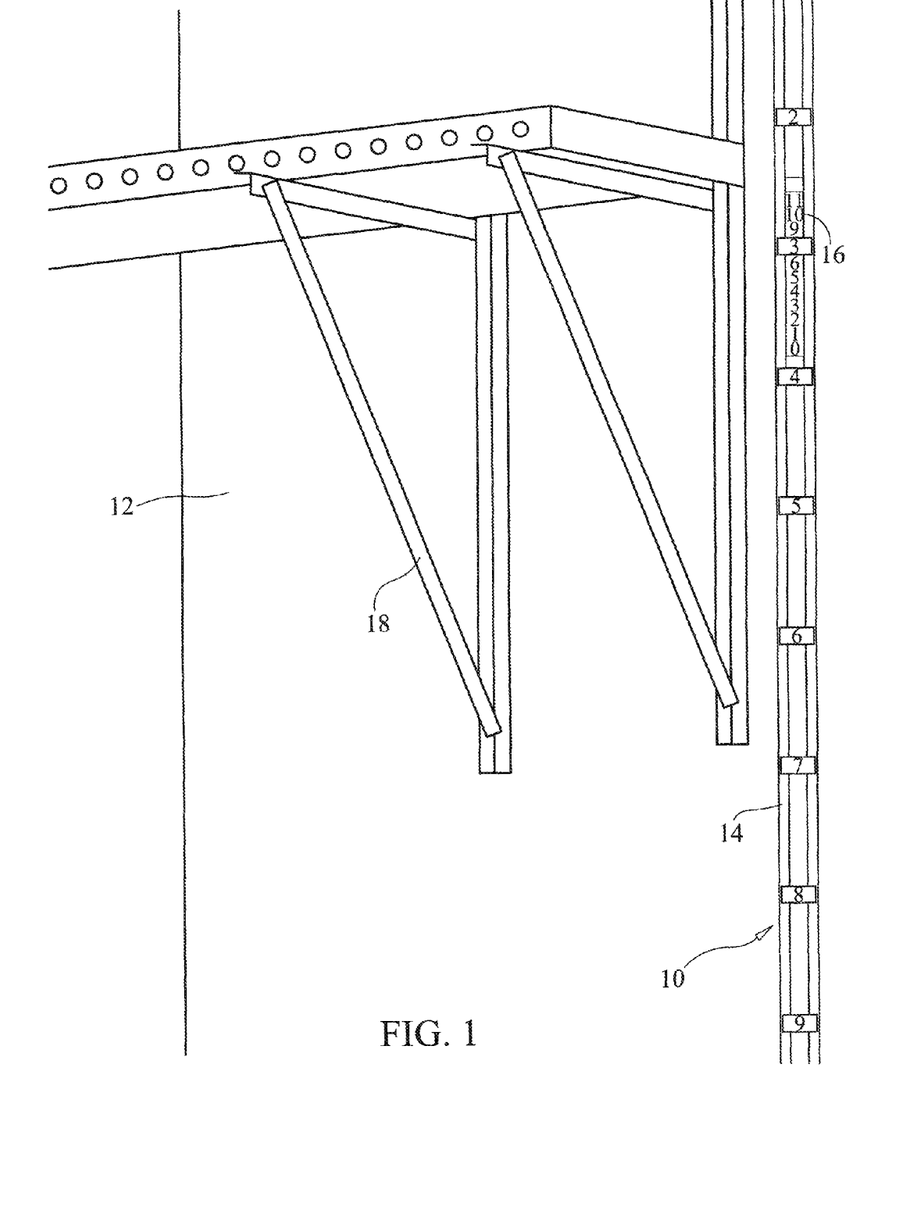
FIG. 1 is front perspective view of the device attached to a storage tank.

Referring now to the figures, FIG. 1 is front perspective view of the device 10 attached to a storage tank 12. FIG. 1 shows the outer gauge tube 14 having spaced-apart numbers for measuring larger units, e.g. feet, with the slidable inner gauge 16 having the number indicia for measuring subparts, e.g. inches. The platform 18 is not part of the invention but represents typical structures that are affixed to the outside of fuel storage tanks 12, and is shown to indicate one example of the relative size of the gauges. In a preferred embodiment, the slidable inner gauge 16 is painted a bright color, e.g. yellow, to enhance the added visibility of the combination inner gauge 16 and outer gauge 14.

Figure 2:
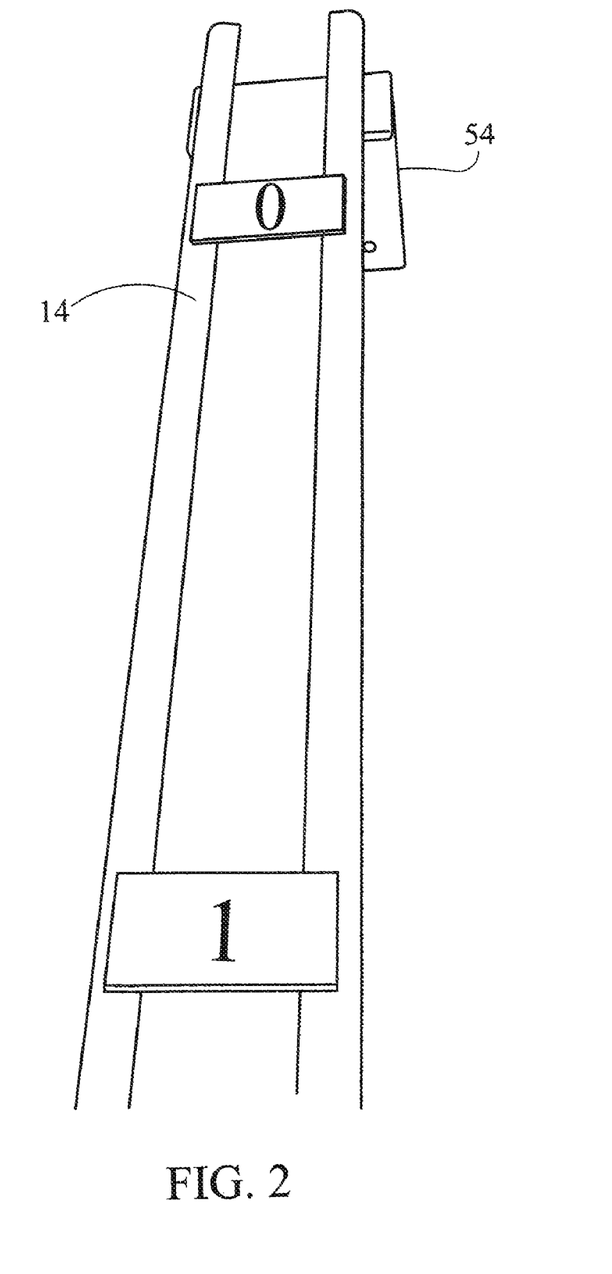
FIG. 2 is a close up frontal view of the outer gauge.

FIG. 2 is a close up frontal view of the outer gauge 14 and shows how the gauge track may be open for better visibility. This is in contrast to other devices where the indicia become worn off due to weathering and the gauge "tube" becomes opaque, reducing visibility. FIG. 2 also shows a tank wall bracket 54 for attaching to the storage tank.

Figure 3A:
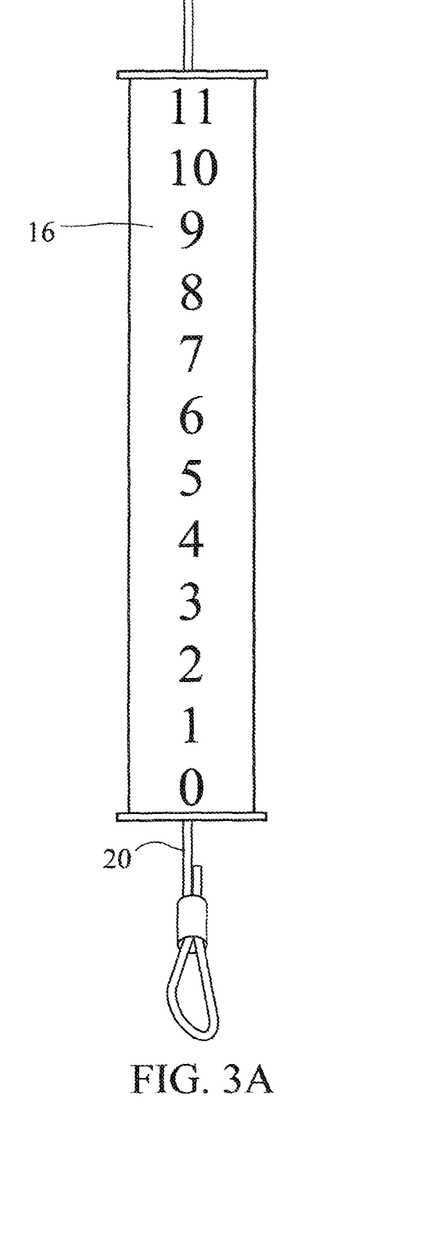
FIG. 3A is a close up frontal view of the inner gauge with the weight carrying cable attached.
Figure 3B:
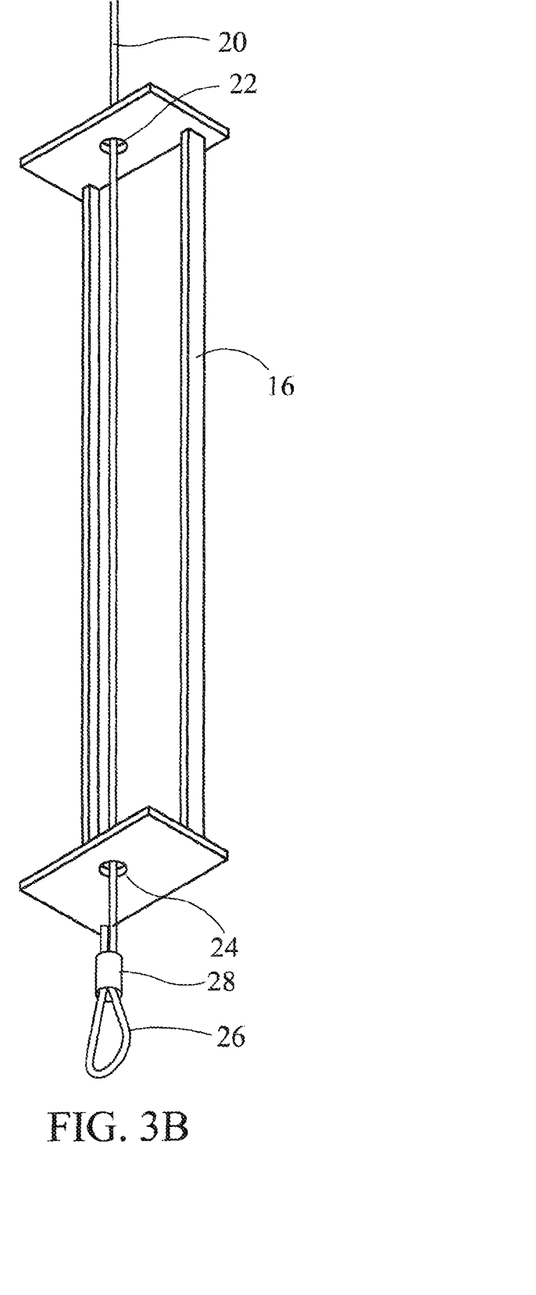
FIG. 3B is a close up elevation view of the back side of the inner gauge with cable attached.

FIG. 3A is a close up frontal view of the inner gauge 16 with the weight carrying cable 20 attached. FIG. 3B is a close up elevation view of the backside of the inner gauge 16 with cable 20 attached. In one example, it is made from welded steel having a high visibility and high durability powder-coating. However, it is contemplated that the invention is not limited to these specific materials, but may be made of other functionally equivalent materials that are available. In a preferred embodiment, these materials are metals, metal alloys, and are powder-coated or weatherproofed, and are able to withstand weathering significantly better than "soft" materials such as plastic piping. The cable is shown threading through a top aperture 22 and a bottom aperture 24, with a loop 26 in the cable 20 made using a cable tie or clamp 28, such that during calibration, the correct amount of weight (if any) may be hung from the loop 26 to form a balanced measuring system when the inner float is taken into account. The weights must be sized to fit within the channel of the outer gauge 14 and not interfere with proper sliding of the inner gauge 16 as it travels up or down depending on the level of the liquid in the tank.

Figure 4:
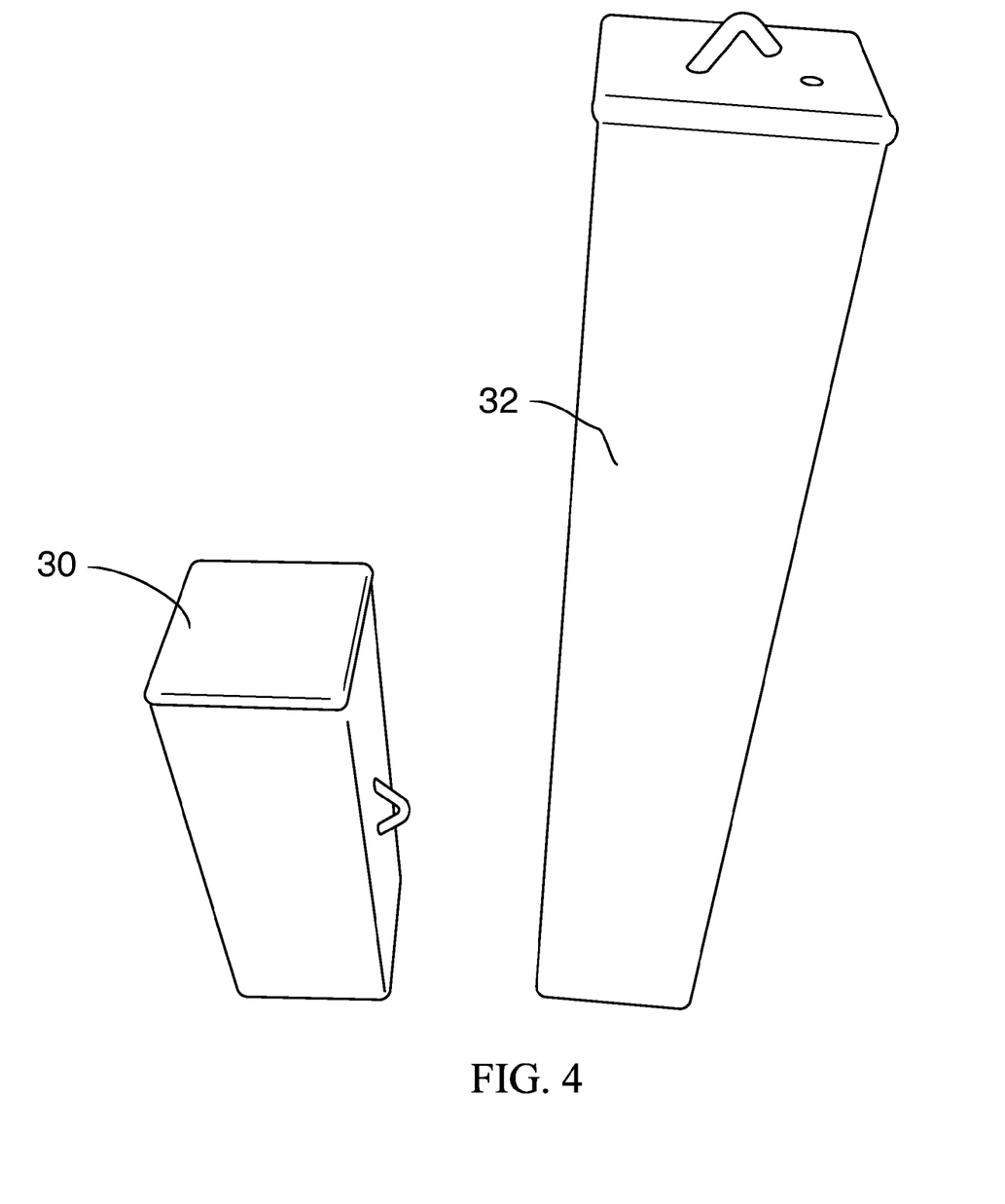
FIG. 4 is an elevation view of a regular float and an interface float.

FIG. 4 is an elevation view of a regular float 30 and an interface float 32. These components must have a weight to maintain the tension on the cable 20 that avoids fouling of the cable 20. These components must also have [[a]] buoyancy in the liquid being stored to enable the outer gauges to accurately reflect the level of the storage tank 12 contents. In this example, they are made from welded, sealed (powder-coated) steel with an easy attachment loop 26 integral to the design. The smaller, regular float is used to measure the overall volume of the liquid in the storage tank 12. It "floats" on, or near, the surface of the liquid at the air/liquid boundary. Although often made from durable materials such as steel, it is the buoyancy of the sealed float that is offset with the inner gauge 16 on the outside of the storage tank 12. The larger interface float 32 is used to measure the level at the interface between, for example, the fuel and water. Since fuel and water commonly have a defined boundary, and each liquid provides its own amount of buoyancy, using a larger float allows the measurement by sinking through the top-most liquid, e.g. oil, and sinking to the bottom level of the top-most liquid. This way, the interface float 32 is positioned at the bottom level of the top-most liquid and at the top level of the second liquid, e.g. water, which is lying below. By measuring this fuel-water interface, and combining with the measurement from the regular float 30, a true reading of the amount of fuel in the storage tank can be obtained.

Figure 5:
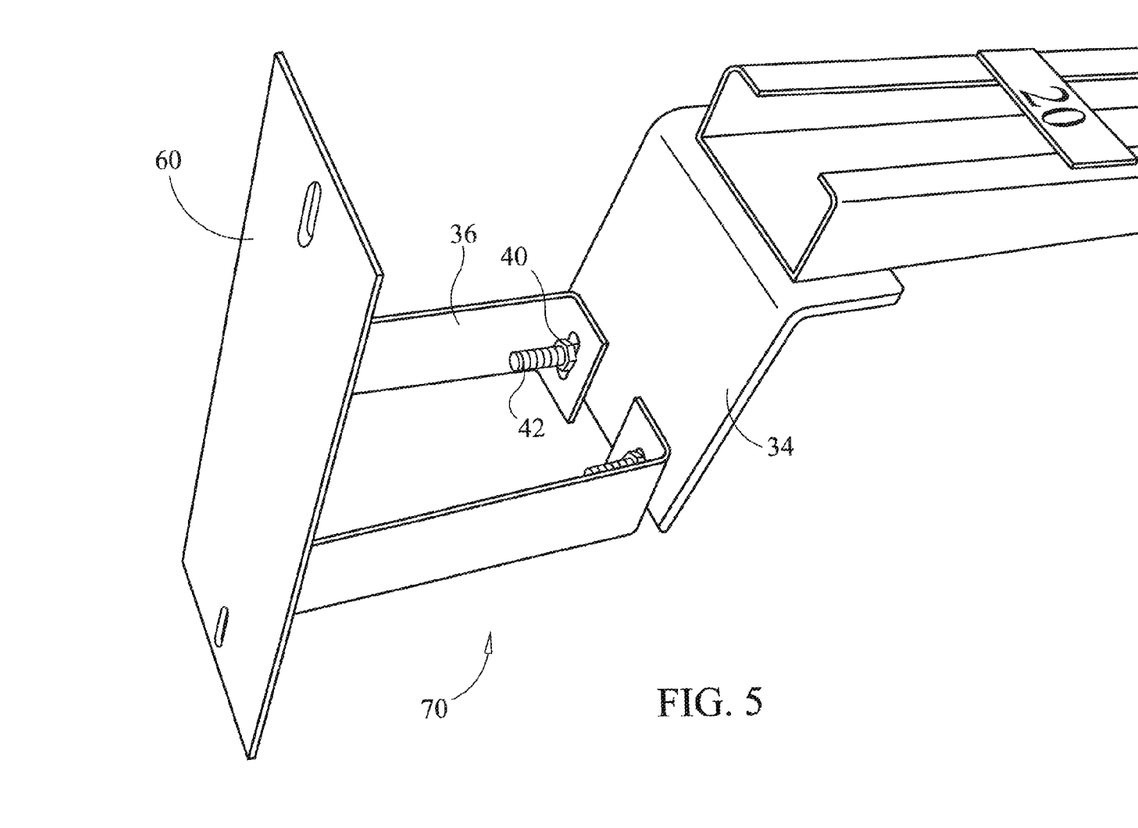
FIG. 5 is a frontal view of the mount for the gauge device, e.g. a pulley (not shown).

FIG. 5 is a frontal view of the mount 70 for the gauge device, e.g. a pulley (not shown). FIG. 5 shows one end of the outer gauge 14 attached to an L bracket 34, which connects to a mounting bracket 36, via a frangible nut 40 and bolt 42 attachment. The mount 70 can be used e.g. for mounting a pulley or for mounting to the ground, etc. The type of attachment is critical since attaching to a steel tank is different from attaching to a fiberglass storage tank. Another important feature is the "break-free" aspect of the footer plate 60 where damage to the gauge results in the gauge breaking free from the storage tank rather than damaging the storage tank. In existing gauges, damage to the gauge can result is puncturing or otherwise tearing open or weakening the storage tank.

Figure 6:
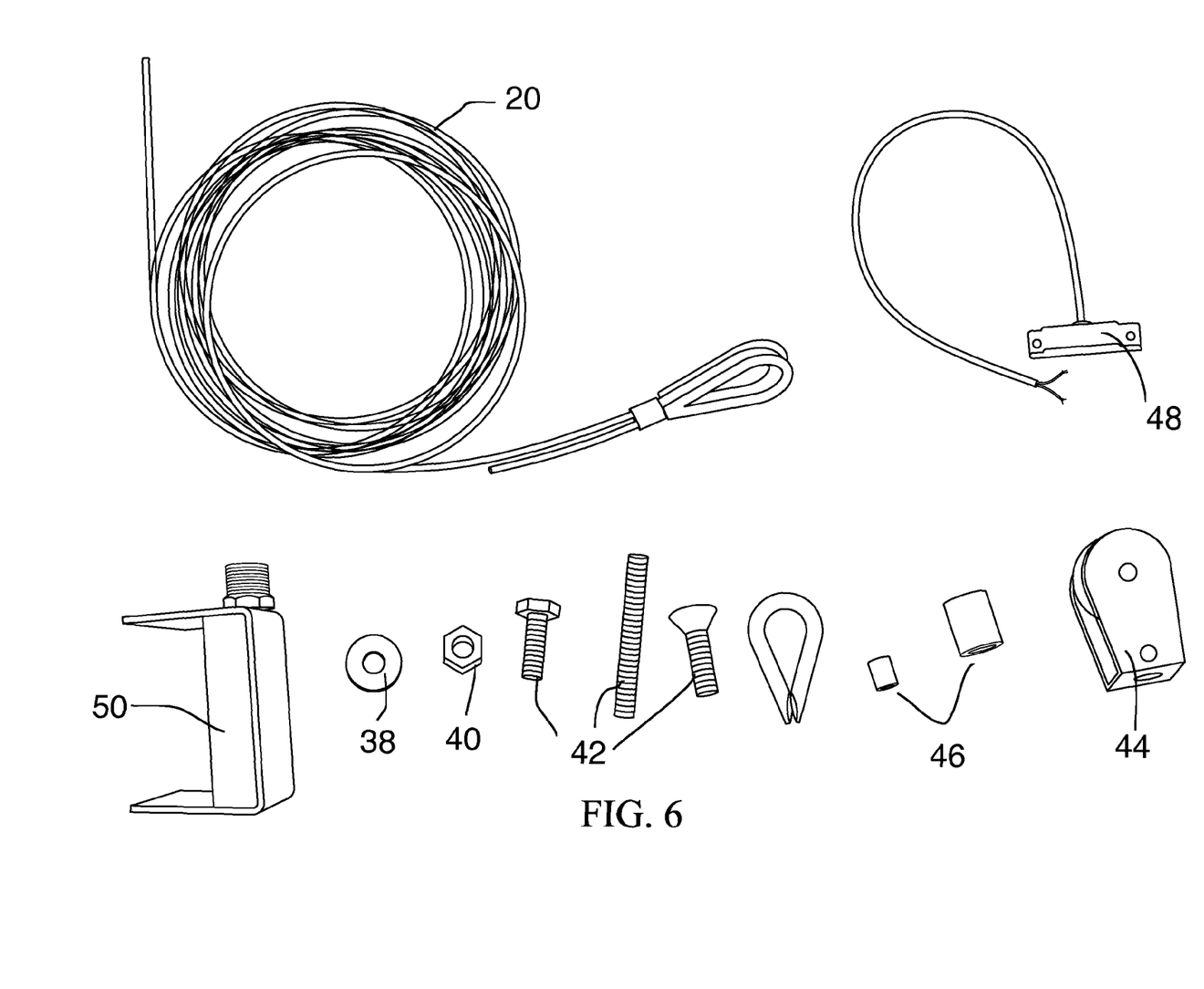
FIG. 6 is a diagram of various component parts, including a cable, washers, nuts, bolts, pulleys, cable ties, an electrical switch, and switch cover.

FIG. 6 is a diagram of various component parts, including a cable 20, washers 38, nuts 40, bolts 42, pulleys 44, cable ties 46, an electrical switch 48, and switch cover 50.

Figure 7:
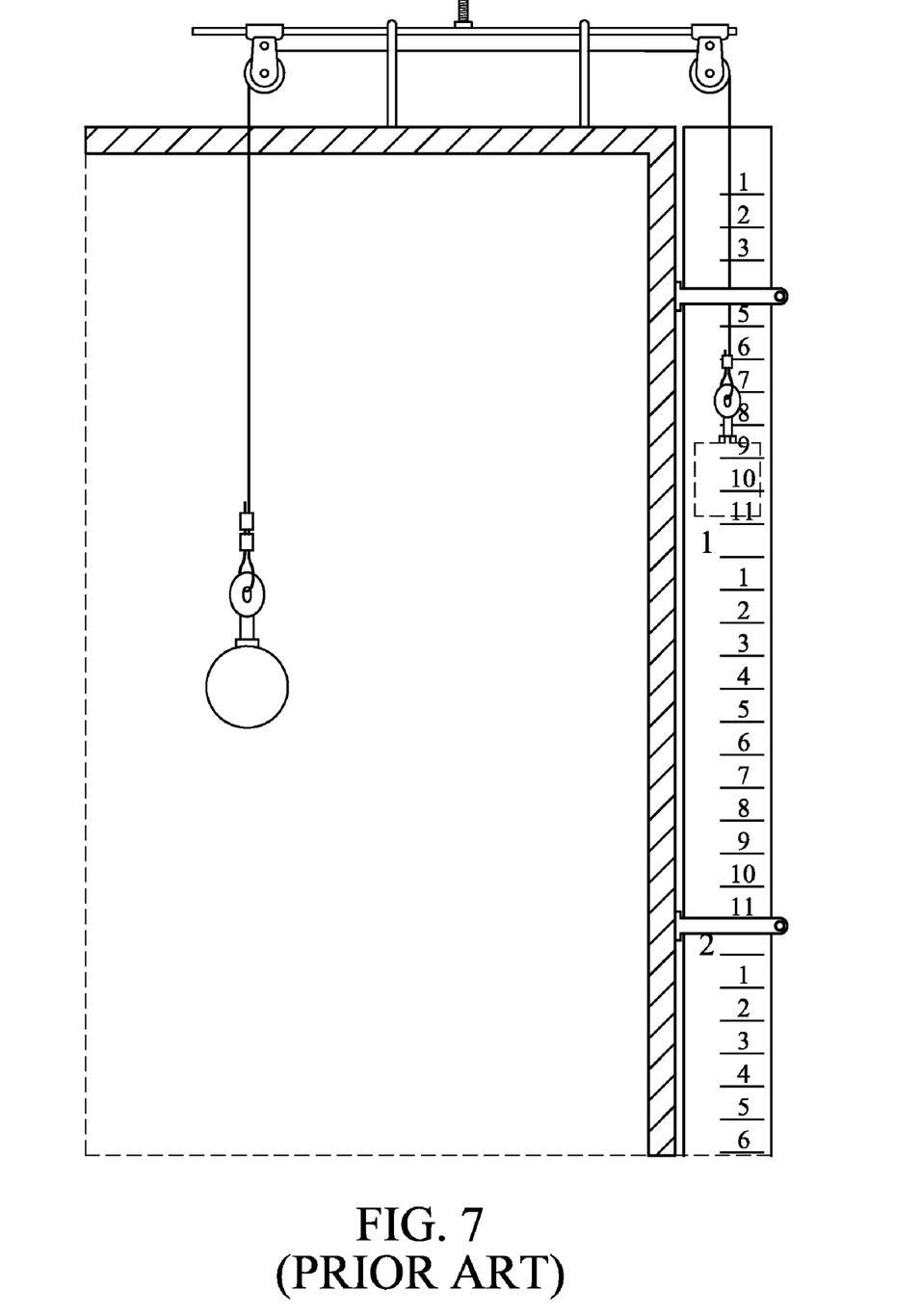
FIG. 7 is a cross-sectional view of a prior art device attached to a storage tank, and shows a weighted float and pulley device and a typical plexiglass outer tube with inner weight.

FIG. 7 is a cross-sectional view of a prior art device attached to a storage tank, and shows a weighted float and pulley device and a typical plexiglass outer tube with inner weight.

Figure 8:
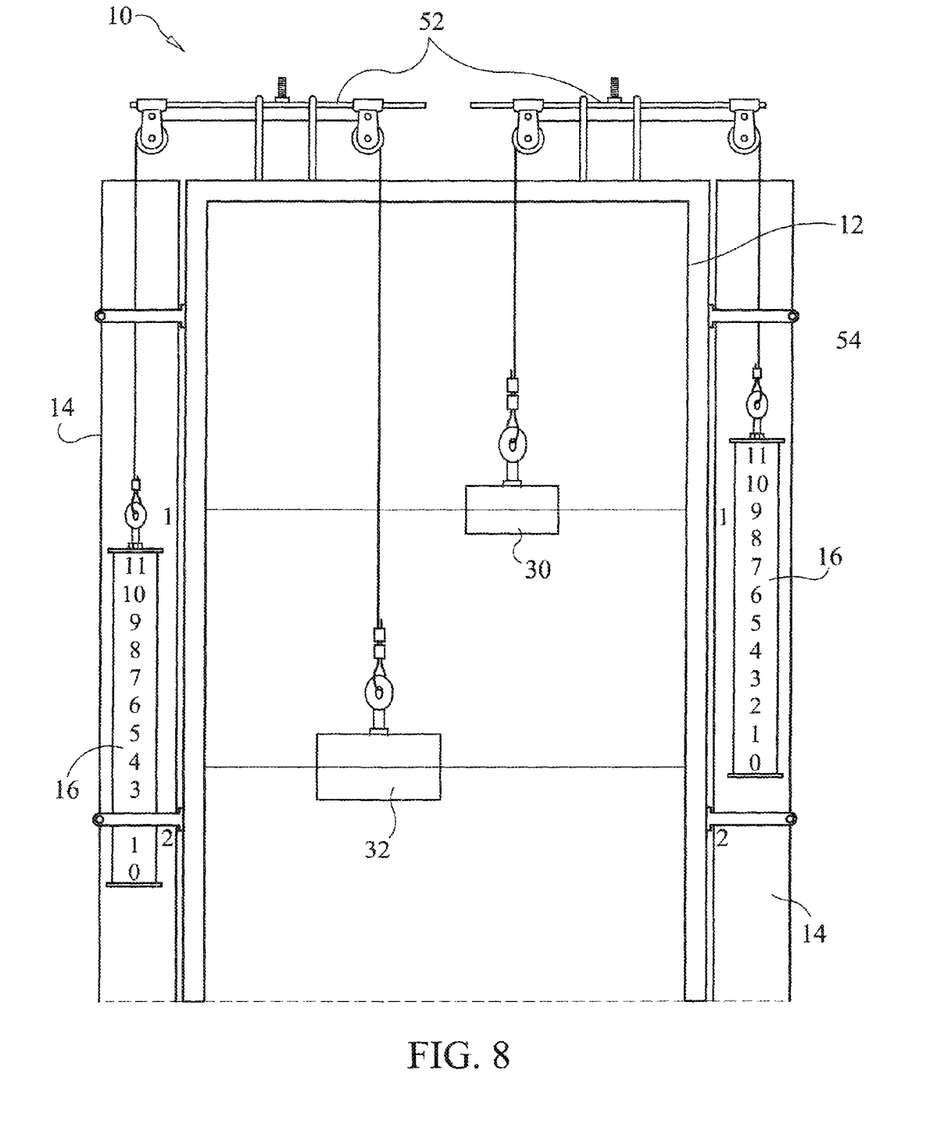
FIG. 8 is a cross-sectional view of a preferred embodiment of the invention attached to a storage tank, and shows the regular upper float and the lower interface float, each connected to a pulley apparatus, but utilizing the combination inner gauge-outer gauge feature.

FIG. 8 is a cross-sectional view of a preferred embodiment of the invention 10 attached to a storage tank 12 by brackets 54, and shows the regular float 30 and the interface float 32, each connected to a pulley apparatus 52, but utilizing the combination inner gauge 16 and outer gauge 14 feature. FIG. 8 shows how the use of an inner gauge 16 and outer gauge 14 improves visibility of the fill reading of the tank 12.

The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable Equivalents.

What is claimed:

1. A tank gauge for bulk liquid above-ground storage tanks, comprising: an elongated outer gauge tube, wherein the outer gauge tube is steel and is C-shaped in cross-section forming an open channel, said outer gauge tube being attached in a vertical position proximate to the bulk liquid above-ground storage tank by a plurality of bolt and nut fasteners, said outer gauge tube having a plurality of indicia marked thereon and associated with the liquid level of said storage tank, said outer gauge tube being attached to the base of the storage tank by a frangible footer attachment, said footer attachment capable of being frangibly detached from the base of the storage tank when subjected to a force associated with the settling or moving of the storage tank, said frangible footer comprises a deformable steel footer plate and frangible steel bolt and nut-type fasteners, and wherein the outer gauge tube houses a weighted slidable inner gauge, said weighted slidable inner gauge capable of travelling vertically within the outer gauge tube by action of a cable, said slidable inner gauge having a plurality of indicia marked thereon and associated in combination with the indicia on the outer gauge tube with the liquid level of said storage tank, said cable connected to the slidable inner gauge and disposed within the outer gauge tube, said cable in operative association with a pulley system for connecting the slidable inner gauge to a weighted intra-tank float, said intra-tank float comprising at least one of either a water phase float or a oil phase float, said pulley system comprising at least one first pulley attached to the top edge of the storage tank and in operative alignment with the outer gauge tube, and at least one second pulley attached to the top of the storage tank for directing said cable into a through-hole in the top of the storage tank for connection to a second weighted intra-tank float, said second intra-tank float comprising at least one of either a water phase float or a oil phase float.

2. The tank gauge of claim 1, further comprising wherein the outer gauge tube is powder-coated steel.

3. The tank gauge of claim 1, further comprising wherein the cable is steel cable having a plastic coating, the diameter of the plastic coated steel cable being about ¼ inch.

* * * * *